Aug. 2, 1932.                    W. BAUSCH                    1,869,456
                              REAR VISION MIRROR
                              Filed June 27, 1930

WILLIAM BAUSCH
*INVENTOR*

BY  G. A. Ellestad
*ATTORNEY*

Patented Aug. 2, 1932

1,869,456

UNITED STATES PATENT OFFICE

WILLIAM BAUSCH, OF ROCHESTER, NEW YORK, ASSIGNOR TO BAUSCH & LOMB OPTICAL COMPANY, OF ROCHESTER, NEW YORK, A CORPORATION OF NEW YORK

REAR VISION MIRROR

Application filed June 27, 1930. Serial No. 464,227.

This invention relates to optical devices and more particularly it has reference to a reflecting device which is adapted for use as a rear vision mirror in automobiles, for example.

Under the prior practice, a rear vision mirror for automobiles has quite generally consisted of a single plane, flat rectangular mirror of suitable size which is located above the windshield in the fore part of the car. Such a mirror, however, is not satisfactory since the field of view is relatively small. It has also been proposed to use two flat, plane mirrors which are adjacent to each other, and angularly disposed and generally independently mounted. This arrangement provides a wider field of view than a single mirror but it is open to the serious objection that the view as seen in the one mirror is not continuous with that seen in the other mirror. In order to provide a rear vision mirror having a continuous view and a wide field, it has been proposed to use a relatively long, narrow spherical mirror made of one piece. Such a mirror is made by cutting out a strip or section of a glass sphere so that manufacturing difficulties are presented and besides that the mirror is quite susceptible to breakage. In making a mirror in this manner the glass sphere cannot be made very large and so the radius of curvature is relatively small. This means that the spherical surface of the mirror produces an image which is very much reduced and hence causes considerable confusion when attempting to estimate the distance to objects whose images are seen in the mirror.

One of the objects of my invention is to provide an improved mirror which will afford a wide field of view. Other objects are to provide a mirror of the type described which will be efficient in use yet simple and durable in structure, to produce a mirror of the type described which will have a wide field of view and will afford a practically continuous, slightly reduced image, and to provide a mirror of the type described which can be readily and cheaply manufactured. Other objects and advantages reside in certain novel features of construction, arrangement and combination of parts as will hereinafter be more fully described and pointed out in the appended claims.

Referring to the drawing.

Figure 1:
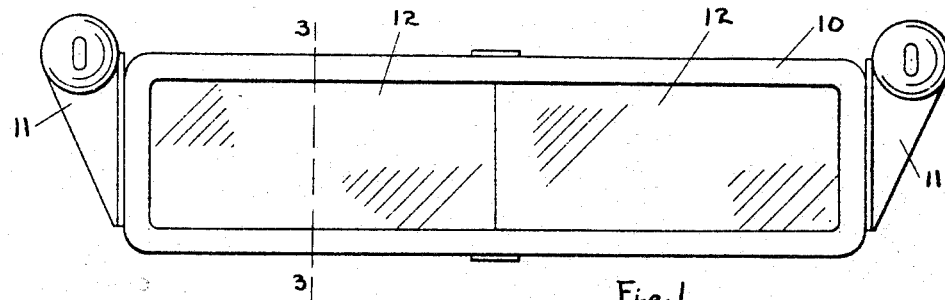
Fig. 1 shows a front elevational view of a mirror embodying my invention.
Figure 2:
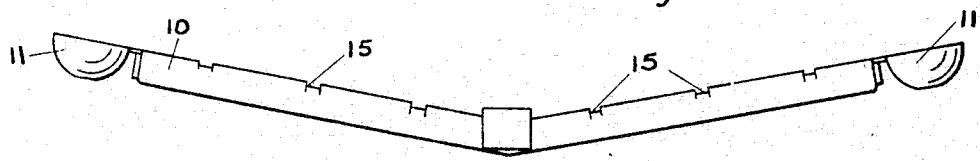
Fig. 2 shows a top plan view of the same.

A preferred embodiment of my invention is shown in the drawing wherein 10 indicates a frame which may be made or formed up of any suitable material in any desirable manner. Supporting devices such as lugs 11 may be secured to frame 10 for cooperation with a suitable bracket. The reflecting elements, such as those indicated at 12, are mounted in frame 10 and may be held therein by a yieldable strip 13, such as cardboard, and a metal backing plate 14 which is retained by the inwardly turned lugs 15 formed integral with frame 10.

Figure 4:
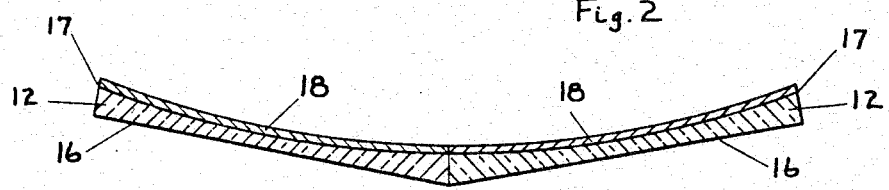
Fig. 4 is a horizontal sectional view of the reflecting elements of my improved mirror.

The elements 12, as shown in Fig. 4, are each formed of a piece of glass by suitably grinding and polishing the surfaces thereof. In the form shown in Fig. 4, the front side of the element 12 has a flat or plane surface 16 and the rear side has a concave spherical surface 17. The spherical surface 17 is provided with a reflecting coating 18, shown in exaggerated size in the drawing, such as silver or the like. The two elements 12 are positioned end to end with their adjacent edges carefully fitted and held in abutting relation as clearly shown in Fig. 4. The elements 12 are also angularly disposed so that the plano sides 16 form an obtuse angle. The angular position and the abutting relation of the two elements 12 are important features as they provide a wider field of view for the mirror.

As one example the mirror shown in Fig. 4 may be made with each element 12 about 8 inches long and about 3 inches wide. The front surface 16 is made plano and the rear surface 17, which is silvered, is made with a spherical curve having a radius of curvature of about 2120 millimeters. It is to be understood, of course, that I do not limit my invention to the use of these dimensions but that they are given by way of example only.

A mirror of the type shown in Fig. 4 functions very well as a rear view mirror for automobiles, for example. Upon looking through the front or plano side of the mirror the rear silvered surface acts as a convex mirror and forms a slightly reduced image. By virtue of the refractive and reflective functions of each element 12 together with the abutting relation and angular disposition of the elements, a relatively wide continuous field of view is obtained and the image is only slightly reduced. Because of my improved structure, such a mirror can be readily and cheaply manufactured as the elements can be made by suitably grinding and polishing glass plates.

Figure 5:
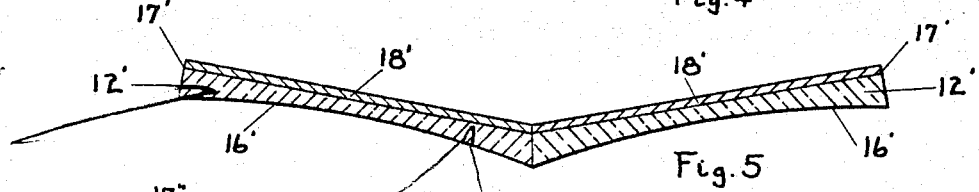
Fig. 5 is a similar view of a modification.

In the modification shown in Fig. 5 the elements 12' are provided with concave spherical front surfaces 16' and plano rear surfaces 17' which are provided with a reflecting coating 18' such as silver, or the like. With this form the portion of the element 12 in front of the plano silvered surface acts as a negative lens and forms a slightly reduced image. A wide field of view is also obtained with this type of mirror.

Figure 6:
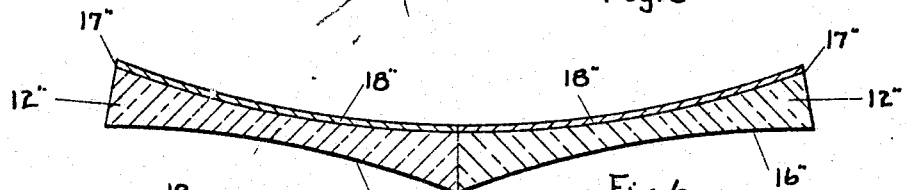
Fig. 6 is a similar view of another modification.
Figure 3:
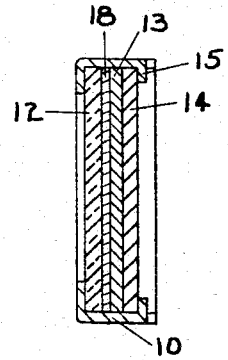
Fig. 3 is a vertical section taken on line 3—3 of Fig. 1.

Another modification is shown in Fig. 6 wherein the element 12'' is provided with a concave spherical surface on both front and rear sides. As an example, the front surface 16'' may have a curvature whose radius is about 3894 millimeters while the rear surface 17'' may have a curvature with a radius of 2120 millimeters, the rear surface being coated with a reflecting layer 18''.

From the foregoing it will be apparent that I am able to attain the objects of my invention and provide an article of the type described which will give a slightly reduced image but will have a relatively wide field of view while still possessing advantages from a manufacturing standpoint. Various modifications can be made without departing from the spirit of my invention.

I claim:

1. A mirror comprising two transparent elements, each of said elements having a spherical surface on one side and a plano surface on the opposite side, the spherical surface of each of said elements being coated with a reflecting substance, said elements being positioned with their edges in abutting relationship and with their plano sides disposed at an obtuse angle.

2. A mirror comprising two relatively long, narrow, transparent elements, each of said elements having a spherical surface on one side, said elements being angularly disposed with their edges in abutting relationship, each of said elements having a reflecting coating on one side thereof.

3. A mirror comprising a frame, a plurality of relatively long, narrow, transparent elements mounted in said frame, said elements being angularly disposed and positioned with their edges in abutting relationship, each of said elements having a spherical surface on one side and a plano surface on the opposite side, one of said surfaces being coated with a reflecting substance.

4. A mirror of the type described comprising a plurality of relatively long, narrow glass elements, each of said elements having a spherical surface on one side and a plano surface on the opposite side, said spherical surface being provided with a reflecting coating, said elements being positioned end to end with their adjacent edges in abutting relation, said elements being angularly disposed with respect to each other whereby a wide field of vision is provided by the mirror.

5. A mirror of the type described comprising a plurality of relatively long, narrow, transparent elements, each of said elements having a spherical surface on one side and a plano surface on the opposite side, said plano side of each element being provided with a reflecting coating, said elements being positioned end to end with their adjacent edges abutting, said elements being angularly disposed with respect to each other whereby a wide field of vision is provided by said mirror.

6. A mirror comprising a plurality of relatively long, narrow, transparent elements, each of said elements having a spherical surface on each side thereof, said elements being angularly disposed and arranged with their edges in abutting relationship, each of said elements having a reflecting coating on one side thereof.

WILLIAM BAUSCH.